United States Patent
Lee et al.

(10) Patent No.: US 6,379,551 B1
(45) Date of Patent: Apr. 30, 2002

(54) METHOD OF REMOVING METAL IONS USING AN ION EXCHANGE MEMBRANE

(75) Inventors: Joseph Y. Lee, South Setauket; Richard F. Salinaro, Hastings on Hudson; Ioannis P. Sipsas, Forest Hills, all of NY (US)

(73) Assignee: Pall Corporation, East Hills, NY (US)

(*) Notice: Subject to any disclaimer, the term of this patent is extended or adjusted under 35 U.S.C. 154(b) by 0 days.

(21) Appl. No.: 09/502,690

(22) Filed: Feb. 11, 2000

Related U.S. Application Data

(63) Continuation of application No. PCT/US98/16978, filed on Aug. 17, 1998, which is a continuation-in-part of application No. 08/912,615, filed on Aug. 18, 1997, now abandoned.

(51) Int. Cl.[7] .............................................. B01D 15/04
(52) U.S. Cl. ..................... 210/638; 210/651; 210/654; 210/681; 210/688
(58) Field of Search ........................ 210/638, 650–651, 210/681, 688, 634, 644, 649, 653, 654, 690, 692, 635; 204/520–523; 134/10; 95/45

(56) References Cited

U.S. PATENT DOCUMENTS

| | | | |
|---|---|---|---|
| 2,929,808 A | * 3/1960 | Ross et al. |
| 2,956,899 A | 10/1960 | Cline |
| 3,247,133 A | * 4/1966 | Chen |
| 3,759,738 A | 9/1973 | Misumi et al. |
| 4,310,400 A | 1/1982 | Mark, Jr. et al. |
| 4,339,473 A | * 7/1982 | D'Agostino et al. |
| 4,358,545 A | 11/1982 | Ezzell et al. |
| 4,417,969 A | 11/1983 | Ezzell et al. |
| 4,478,695 A | 10/1984 | Ezzell et al. |
| 4,500,396 A | 2/1985 | D'Agostino et al. |
| 4,586,992 A | 5/1986 | Miyake et al. |
| 4,604,323 A | 8/1986 | Johnson |
| 4,605,685 A | * 8/1986 | Momose et al. |

(List continued on next page.)

FOREIGN PATENT DOCUMENTS

| | | |
|---|---|---|
| EP | 0 032 021 | 7/1981 |
| EP | 0 596 441 | 5/1994 |
| GB | 2117797 | 10/1983 |
| WO | WO 83/02462 | 7/1983 |

OTHER PUBLICATIONS

Database WPI, Week 1970/14, Derwent Publications Ltd., AN 70–23490R (JP 70008989 abstract).

Database WPI, Week 1978/07, Derwent Publications Ltd., AN 78–13322A (JP 53001183 abstract).

Database WPI, Week 1982/01, Derwent Publications Ltd., AN 82–00509E (JP 56152843 abstract).

Database WPI, Week 1983/03, Derwent Publications Ltd., AN 83–06078K (JP 57198281 abstract).

Database WPI, Week 1987/21, Derwent Publications Ltd., AN 87–146391 (JP 62 083006 abstract).

Database WPI, Week 1991/26, Derwent Publications Ltd., AN 91–188955 (JP 3115439 abstract).

(List continued on next page.)

*Primary Examiner*—Matthew O. Savage
*Assistant Examiner*—Marianne Ocampo
(74) *Attorney, Agent, or Firm*—Leydig, Voit, & Mayer, Ltd.

(57) ABSTRACT

The present invention provides an ion exchange membrane having a porous polymeric support grafted with an organic moiety to which is covalently bonded at least one ion exchange group, and methods for preparing the ion exchange membrane. A method for treating a fluid containing ions wherein ions are removed by contacting the fluid with an ion exchange membrane of the present invention is also provided. In addition, the present invention provides a filtration apparatus for removing ions from a fluid, which filtration apparatus utilizes an ion exchange membrane of the present invention.

23 Claims, 3 Drawing Sheets

U.S. PATENT DOCUMENTS

| | | | |
|---|---|---|---|
| 4,629,656 A | | 12/1986 | Alberti et al. |
| 4,747,954 A | * | 5/1988 | Vaughn et al. ............... 210/670 |
| 4,778,601 A | * | 10/1988 | Lopatin et al. ........ 210/500.27 |
| 5,009,678 A | | 4/1991 | Bikson et al. |
| 5,049,253 A | * | 9/1991 | Izuo et al. |
| 5,075,342 A | | 12/1991 | Ishigaki et al. |
| 5,087,372 A | * | 2/1992 | Toyomoto et al. .......... 210/651 |
| 5,310,486 A | * | 5/1994 | Green et al. ................ 210/638 |
| 5,350,714 A | * | 9/1994 | Trefonas, III et al. |
| 5,354,434 A | | 10/1994 | Satoh et al. |
| 5,378,802 A | * | 1/1995 | Honda |
| 5,439,990 A | | 8/1995 | Maeda et al. |
| 5,472,616 A | * | 12/1995 | Szmanda et al. ........... 210/683 |
| 5,476,591 A | * | 12/1995 | Green ........................ 210/638 |
| 5,476,750 A | * | 12/1995 | Rahman et al. |
| 5,500,127 A | * | 3/1996 | Carey et al. ................ 210/685 |
| 5,531,899 A | | 7/1996 | Yen et al. |
| 5,531,900 A | * | 7/1996 | Raghavan et al. .......... 210/651 |
| 5,618,433 A | * | 4/1997 | Tarbet et al. ................ 210/634 |
| 5,618,622 A | | 4/1997 | Gillberg-Laforce et al. |
| 5,648,400 A | | 7/1997 | Sugo et al. |
| 5,874,204 A | * | 2/1999 | Sugawara et al. |
| 5,962,183 A | * | 10/1999 | Rahman et al. |
| 5,989,434 A | * | 11/1999 | Lundquist et al. .......... 210/679 |
| 5,990,356 A | * | 11/1999 | Commarieu et al. |

OTHER PUBLICATIONS

Database WPI, Week 1992/33, Derwent Publications Ltd., AN 92–274021 (JP 4187663 abstract).

Database WPI, Week 1994/16, Derwent Publications Ltd., AN 94–132114 (JP 6080799 abstract).

Database WPI, Week 1995/18, Derwent Publications Ltd., AN 95–136150 (JP 7060243 abstract).

Database WPI, Week 1995/34, Derwent Publications Ltd., AN 95–260191 (JP 7163886 abstract).

Patent Abstracts of Japan, 98 (3), (Feb. 27, 1998) (JP–A–09 296368).

* cited by examiner

METHOD OF REMOVING METAL IONS USING AN ION EXCHANGE MEMBRANE

CROSS-REFERENCE TO RELATED APPLICATIONS

This application is a continuation of International Patent Application No. PCT/US98/16978, filed on Aug. 17, 1998, now WO 99/0909which designates the U.S., which in turn is a continuation-in-part of U.S. patent application Ser. No. 08/912,615, filed Aug. 18, 1997, now abandoned.

FIELD OF THE INVENTION

The present invention relates to methods of using an ion exchange membrane to treat fluids.

BACKGROUND OF THE INVENTION

Ion exchange membranes are used in a variety of applications. Cation exchange membranes, for example, have become increasingly significant, primarily due to their application in electrochemical cells in chlor-alkali production. For example, fluoropolymeric cation exchange membranes, such as NAFION® (DuPont), have enjoyed widespread development as barriers separating the anode and cathode compartments of electrolytic cells used in the production of chlorine and caustic. The success of fluoropolymeric cation membranes in chlor-alkali production is attributed to the ability of the membranes to allow selective permeation of sodium ions in NaCl solutions while rejecting chloride ions, resulting in cleaner caustic solutions having substantially lower salt content.

In addition to functioning as an ion barrier, ion exchange membranes provide an attractive means for ion removal. The removal of ions is important in many industries, such as the microelectronics industry, where ion contaminants in very small concentrations can adversely affect the performance and fabrication of microchips. For example, the ability to prepare positive and negative photoresists with ultra low levels of metal ion contaminants, without requiring the addition of chemical reagents, is highly desirable in microlithography. Further, the ability to remove anionic and cationic impurities to provide ultra high purity water, for example, is highly desirable in deionized water purification, desalination of brine, and removal of ionic contaminants from pharmaceutical compositions.

While fluoropolymeric cation exchange membranes are widely used as permselective electrochemical barriers in caustic production processes, their solid homogeneous structure and low fluid flux across the membrane make them unsuitable as ion filtration devices. In particular, fluoropolymeric cation exchange membranes, such as NAFION® (DuPont), generally are considered nonporous and exhibit no appreciable fluid flow rate therethrough, thereby rendering such membranes unsuitable for filtration applications. Further, fluoropolymeric membranes tend to be incompatible with various organic solvents due to swelling and instability. Similarly, other types of ion exchange membranes and ion exchange resins are limited in their applicability in ionic filtration applications due to low fluid flux, organic solvent instability, and low ion exchange capacity.

Further, porous media to which are applied ion exchange resins for the removal of ions have substantial limitations. Such ion exchange media are limited by the characteristics and extent of the ion exchange resin on the surface of the porous media. In particular, the ion exchange reaction is essentially limited to the exposed resin surface area, and, therefore, a large portion of unexposed resin is unused and does not participate in the ion exchange process. Moreover, the generally discrete (rather than continuous or homogeneous) positioning of ion exchange resins on the porous media leads to significant areas of the porous media not participating in the ion exchange process. As a result, such ion exchange media exhibit poor performance (e.g., poor kinetic properties).

Thus, there exists a need for an ion exchange membrane having high ion exchange capacity, stability in a variety of solvents, particularly organic solvents, and a fluid flux suitable for application in filtration. Moreover, there exists a need for materials and methods which enable the removal of trace heavy metal ions from organic and aqueous solvents. Further, there exists a need for materials and methods which enable the removal of trace ionic contaminants from organic solvents, particularly photoresist solvents. The present invention provides such an ion exchange membrane and associated methods. These and other objects of the present invention will be apparent from the detailed description of the preferred embodiments of the invention set forth below.

BRIEF SUMMARY OF THE INVENTION

The present invention provides an ion exchange membrane having a porous polymeric support grafted with an organic moiety having at least one ion exchange group covalently bonded thereto.

The present invention also provides a method for preparing an ion exchange membrane wherein a porous polymeric support is contacted with at least one organic monomer, which is then grafted to the porous polymeric support. At least one ion exchange group is subsequently introduced and covalently bonded to the grafted organic moiety to provide a porous polymeric support grafted with an organic moiety having at least one ion exchange group.

The present invention further provides a method for preparing an ion exchange membrane wherein a porous polymeric support is contacted with at least one organic monomer bearing at least one ion exchange group covalently bonded thereto. The organic monomer is then grafted to the porous polymeric support, thereby providing a porous polymeric support grafted with an organic moiety having at least one ion exchange group covalently bonded thereto.

The present invention provides a method for treating a fluid containing ions wherein ions are removed by contacting the fluid with an ion exchange membrane of the present invention. In addition, the present invention provides a filtration apparatus for removing ions from a fluid, resulting in a filtrate having a lower ion concentration. The filtration apparatus of the present invention is useful for removing trace ion contaminants from organic and aqueous solvents to provide ultra high purity solvents with extremely low concentrations of ionic contaminants. The filtration apparatus has a filter unit which utilizes an ion exchange membrane of the present invention and a means for passing the fluid through the filter unit.

DETAILED DESCRIPTION OF THE INVENTION

Figure 1:
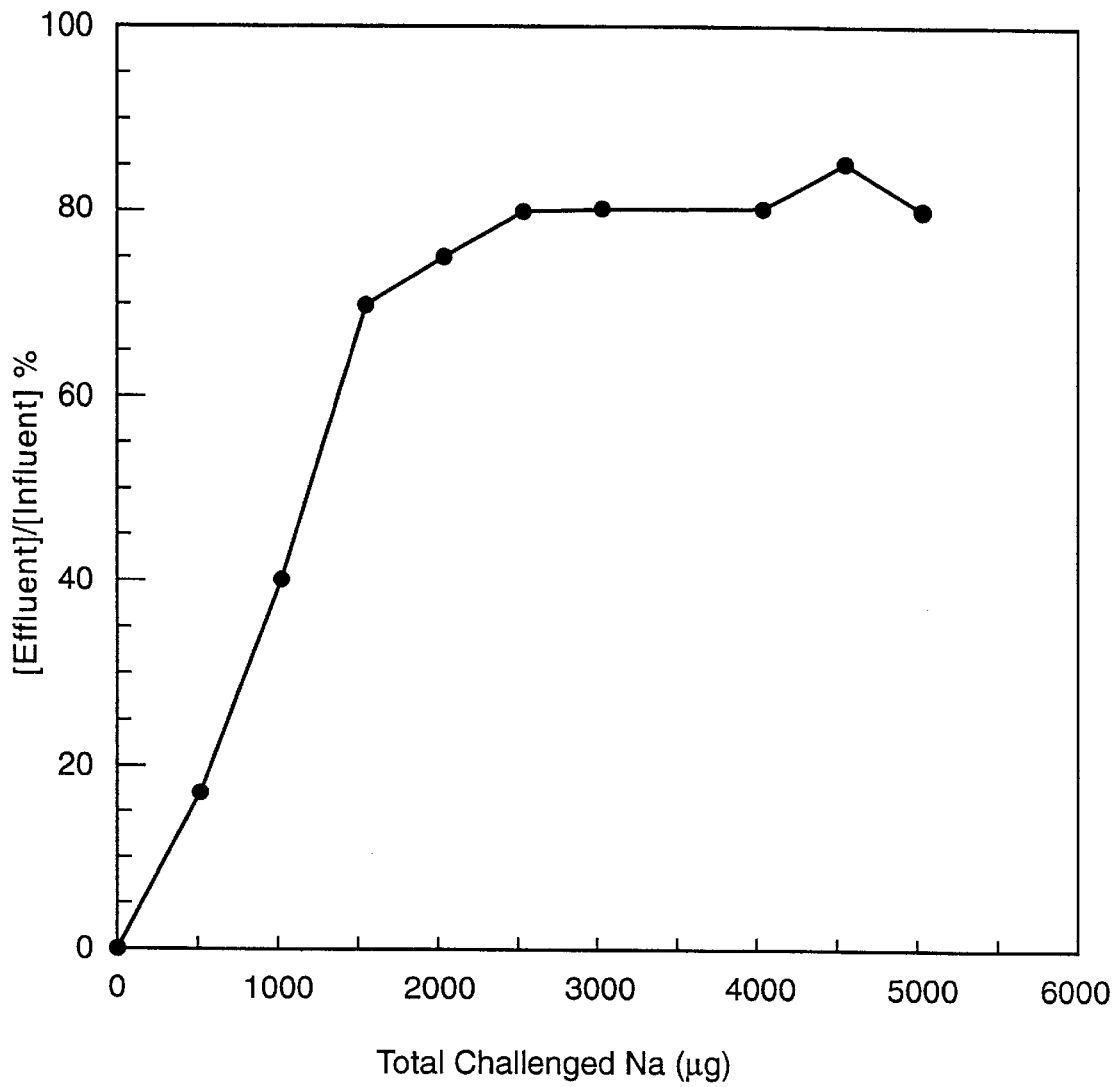
FIG. 1 is a graphical depiction of the breakthrough curve ([Effluent]/[Influent]% versus Total Challenged Na($\mu$g))for an ion exchange membrane of the present invention in a Na-spiked ethyl lactate solution.

The present invention provides an ion exchange membrane comprising a porous polymeric support grafted with an organic moiety to which is covalently bonded at least one ion exchange group. The organic moiety preferably is uniformly grafted throughout the entire surface of the porous polymeric support (including the interior surfaces of the pores, e.g., the interior surface of the porous matrix). Thus, the surface area and the accessibility of the ion exchange groups (e.g., to ions in a fluid) is enhanced by the homogeneous distribution of the ion exchange groups throughout the ion exchange membrane surface. Per unit of mass, the present inventive ion exchange membrane has an ion exchange capacity which can dramatically outperform analogous ion exchange media derived from ion exchange resins.

In the ion exchange membrane of the present invention, the organic moiety possesses (e.g., is substituted with) at least one ion exchange group attached to the organic moiety by a covalent bond. A suitable ion exchange group is any functional group, any combination of functional groups, or any derivative thereof, having an affinity for ions. Preferably, the ion exchange group is capable of forming an ionic bond with ions contained in a suitable fluid medium to be treated with the membrane of the present invention. The ion exchange group can be a cation exchange group, such as, for example, a sulfonic acid, a carboxylic acid, a phosphonic acid, a boronic acid, or any suitable derivative, including salts thereof, having an affinity for ions. Alternatively, the ion exchange group can be an anion exchange group such as, for example, a quaternary ammonium salt. Preferably, the ion exchange group is a cation exchange group selected from the group consisting of a sulfonic acid, a carboxylic acid, suitable salts thereof, and suitable derivatives thereof. In one preferred embodiment, a sulfonic acid group is covalently bonded to the ion organic moiety, which is grafted to the porous polymeric support. In another preferred embodiment, a sulfonic acid group and a carboxylic acid are covalently bonded to the organic moiety.

The membrane of the present invention can be a cation exchange membrane or an anion exchange membrane, depending on the nature of the ion exchange group. If the organic moiety has a cation exchange group (i.e., an ion exchange group having an affinity for cations), then the membrane is a cation exchange membrane. If the organic moiety has an anion exchange group (i.e., an ion exchange group having an affinity for anions) such as, for example, a quaternary ammonium salt, then the membrane is an anion exchange membrane.

A combination of cation exchange groups and anion exchange groups can be covalently bonded to the organic moiety of the ion exchange membrane of the present invention. The ion exchange properties of a membrane of the present invention having both types of ion exchange groups will generally depend upon which type of ion exchange group predominates over the other. For example, an ion exchange membrane of the present invention, wherein the ratio of sulfonic acid groups to trimethylammonium groups is about two to one, will typically have the properties of a cation exchange membrane.

It will be appreciated that the present invention also embodies single-layer and multiple-layer, e.g., superimposed multiple-layer, films wherein each layer has a porous polymeric support grafted with an organic moiety to which is covalently bonded at least one ion exchange group. The number of individual layers can be increased to provide greater ion exchange capabilities depending on the particular use employed. Of course, the individual layers need not be identical in physical or chemical structure. For example, a four-layer system can include four identical layers of sulfonic acid ion exchange media (e.g., membrane layers) or two pairs of alternating sulfonic acid and carboxylic acid ion exchange membranes.

The ion exchange membrane of the present invention is particularly useful for removing ion contaminants from organic and/or aqueous liquids to provide ultra high purity liquids which are virtually free of ionic contaminants.

The porous polymeric support can be any suitable porous membrane, which can be structurally amorphous, crystalline, or any suitable morphologic combination thereof. The porous polymeric support can be made of any suitable polymer such as, for example, polyolefins (including fluorinated polyolefins), polyamides, polyacrylates, polyesters, nylons, polysulfones (PS), polyethersulfones (PES), celluloses, polycarbonates, single polymers, copolymers, composites, and combinations thereof. A person of ordinary skill in the art will appreciate the porous polymeric support can be made of other suitable polymeric substances that are capable of being chemically grafted to the organic moiety, to which an ion exchange group is covalently bonded.

Preferably, the porous polymeric support comprises a polyolefin. Any suitable polyolefin can be used in the porous polymeric support of the present inventive ion exchange membrane. Suitable polyolefins include, for example, polyethylene, polytetrafluoroethylene (PTFE), and polyvinylidene fluoride (PVDF). More preferably, the porous polymeric support comprises polyethylene, particularly ultra high molecular weight polyethylene (e.g., polyethylene of molecular weight of at least about 500,000 Daltons (such as about 500,000–5,000,000 Daltons), preferably about 1,000,000 Daltons or more).

Membranes containing voids that are large relative to molecular dimensions are considered porous (e.g., porous membranes in the context of the present invention can allow molecules to pass therethrough). In porous membranes, the pores are interconnected, and the polymer can constitute only a small percentage of the total volume. Porous membranes are commonly known in the art and can be obtained commercially or can be prepared by any suitable method. Preparation methods for porous polymeric membranes include, for example, liquid phase separation of a polymer solution by cooling, chemical etching of tracks induced by radiation damage, coagulation of a polymer solution by a nonsolvent, controlled stretching of a polymer film, and sintering of fine polymer particles. Of course, such porous membranes can be reinforced, for example, with fabric (e.g., a woven fibrous web) or fiber (e.g., a nonwoven fibrous web), to provide mechanical rigidity and strength.

The pores can be of any suitable size, and the pores can vary, for example, in their arrangement, uniformity, symmetry, shape, and texture. The porous polymeric support membrane can be, for example, a microporous membrane. The membranes of the present invention have a pore size preferably greater than about 0.01 $\mu$m (e.g., about 0.01–100 $\mu$m), more preferably greater than about 0.1 $\mu$m (e.g., about 0.1–50 µm). However, the ion exchange membrane of the present invention is not subject to the strict pore size requirements for applications directed to particle filtration.

The membrane can be in any suitable configuration including, but not limited to, tubules, stacks, sheets, cartridges, hollow fibers, microtubules, plate-frame assemblies, and pleated filter cartridges. For example, hollow fibers provide an advantage for membranes used in separation processes by providing a high surface area to unit volume ratio. Hollow fibers with inside diameters as small as 10 µm can be formed using spinning technology adapted from the synthetic fiber industry. Early work on hollow fibers was directed toward reverse-osmosis applications, but now these configurations are used in a variety of other membrane applications, such as hemodialysis and gas separations.

The organic moiety can be any suitable organic substance capable of covalently bonding with an ion exchange group and capable of being attached by a graft to the porous polymeric support (other than by way of the ion exchange group). It will be appreciated that the physical and molecular structure of the organic moiety, which is grafted to the porous polymeric support, can vary substantially depending on the method, materials, and conditions employed in the grafting process, as well as post-graft treatment. Furthermore, the grafted substance can be monomeric, oligomeric, or polymeric depending on the method, materials, and conditions employed in the grafting process, as well as in post-graft treatment conditions. The organic moiety can be formed, for example, by grafting to the porous polymeric support any suitable organic monomer, a mixture of one or more different monomers, suitable oligomeric substances, or any suitable combination thereof, capable of forming a graft to the porous polymeric support. Alternatively, the organic moiety can be formed, for example, by grafting a suitable organic monomer, or a mixture of one or more different organic monomers, to the porous polymeric support. In either embodiment, the organic moiety is an organic substance which is attached to the porous polymeric support by way of a graft, and at least one ion exchange group (e.g., a sulfonic acid or a carboxylic acid) is covalently bonded to the organic moiety.

While any suitable organic moiety can be utilized, the organic moiety preferably is an aryl moiety. The aryl moiety can encompass one or more aromatic rings. The term "aromatic ring" as used herein refers to a carbocyclic or heterocyclic ring or ring system having "aromaticity" as is commonly known in the chemical arts. The aromatic rings can be the same or different, substituted or unsubstituted, fused, bonded, cross-linked or interconnected, symmetrically or unsymmetrically, and in any combination regardless of order, sequence, or arrangement. For example, the aryl moiety can comprise a monocyclic aromatic ring such as, for example, a benzene ring. The aryl moiety also can comprise a fused aromatic ring such as, for example, a naphthalene, a benzothiophene, or an anthracene ring. The aryl moiety also can comprise aromatic ring systems with other arrangements such as, for example, biphenyl, biphenyl ether, or biphenyl sulfone ring systems. The aromatic ring of the aryl moiety is not limited to carbocyclic aromatic rings; rather, the aromatic ring also can be hetercyclic. For example, the aryl moiety can comprise a heterocyclic aromatic rings such as a thiophene ring, or a furan ring.

Preferably, the organic moiety comprises an aryl moiety to which is covalently bonded an ion exchange group, so as to provide an ion exchange membrane. The ion exchange group, which is desirably covalently bonded to the aromatic ring, is preferably a sulfonic acid ion exchange group, a suitable salt, or a suitable derivative thereof. Most preferably, the ion exchange group covalently bonded to the aromatic ring of the aryl moiety is a sulfonic acid ion exchange group. In a preferred embodiment, the aromatic ring of the aryl moiety is a benzene ring.

In another preferred embodiment, at least one sulfonic acid and at least one carboxylic acid are covalently bonded to the organic moiety of the present ion exchange membrane. In yet another preferred embodiment, the ion exchange membrane of the present invention comprises an organic moiety which includes an aryl moiety, to which is covalently bonded an ion exchange group, and a diacid moiety derived from a diacid monomer of the formula:

Formula I

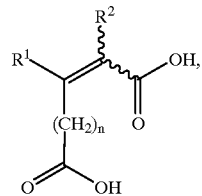

wherein $R^1$ or $R^2$ are independently H, $C_1$–$C_6$ alkyl, or phenyl, and at least one hydrogen atom on the $C_1$–$C_6$ alkyl substituent or the phenyl substituent is optionally substituted with at least one substituent selected from the group consisting of F, Cl, Br, I, nitro, cyano, and OH; and n is an integer from 0 to 2; an ester thereof, or an anhydride thereof. This particular embodiment not only utilizes the advantageous properties of the ion exchange group covalently bonded to the aryl moiety, but further has the advantages of the di-carboxylic acid ion exchange groups of the diacid moiety, which has been discovered to result in excellent ion exchange capacity with respect to the removal of heavy metals (e.g., Fe ions) from aqueous and non-aqueous fluids containing such ions. In this embodiment, it is preferred that the aryl moiety comprises an aromatic ring to which is covalently bonded an ion exchange group selected from the group consisting of a sulfonic acid, a carboxylic acid, suitable salts thereof, and suitable derivatives thereof. More preferably, the ion exchange group covalently bonded to the aromatic ring of the aryl moiety is a sulfonic acid or a carboxylic acid ion exchange group. Most preferably the ion exchange group covalently bonded to the aromatic ring of the aryl moiety is a sulfonic acid ion exchange group.

It will be appreciated that the diacid moiety, which is a component of the organic moiety, is grafted to the porous polymeric support and that the diacid moiety, as such, does not have the same structure as the ungrafted diacid monomer from which it is derived. It also will be appreciated that the physical and molecular structure of the diacid moiety, as it exists when it is grafted to the porous polymeric support, can vary substantially depending on the method, materials, and conditions employed in the grafting process, as well as in any post-graft treatment employed in the overall process. Thus, as indicated in the structural representation of Formula I, the double bond of the diacid monomer need not be in any particular configuration (e.g., E, Z, cis, or trans), in order to form a graft with the porous polymeric support.

In the diacid monomer, n is preferably zero (0), in which case there is no alkyl linker between the double bond and the carboxylate groups bonded thereto. It is also preferred that one of the positions $R^1$ or $R^2$ is H. More preferably, the double bond of the diacid monomer is unsubstituted, in which case both $R^1$ and $R^2$ are H. In a highly preferred embodiment, the aryl moiety comprises a benzene ring to which is covalently bonded a sulfonic acid ion exchange group and the diacid moiety is derived from maleic acid.

The present invention further provides a method for preparing an ion exchange membrane which includes providing a porous polymeric support, contacting the porous polymeric support with an organic monomer capable of forming a chemical graft to the porous polymeric support, and grafting the organic monomer to the porous polymeric support to provide an organic moiety grafted to the porous polymeric support, wherein either the organic monomer comprises an ion exchange group covalently bonded thereto or an ion exchange group is introduced and covalently bonded to the organic moiety after it has been grafted to the porous polymeric support, so as to provide an ion exchange membrane. Preferably, the organic monomer is an aryl monomer comprising an aromatic ring, optionally bearing (substituted with) an ion exchange group covalently bonded thereto. When an aryl monomer is utilized, the present method of preparing an ion exchange membrane comprises providing a porous polymeric support, contacting the porous polymeric support with an aryl monomer comprising an aromatic ring, and grafting the aryl monomer to the porous polymeric support to provide an organic moiety comprising an aromatic ring, wherein desirably either the aryl monomer comprises an aromatic ring bearing an ion exchange group covalently bonded thereto, or an ion exchange group is introduced and covalently bonded to an aromataic ring of the organic moiety grafted to the porous polymeric support, so as to provide an ion exchange membrane.

The present method of preparing an ion exchange membrane further includes providing a porous polymeric support, contacting the porous polymeric support with an organic monomer and at least one diacid monomer of the formula:

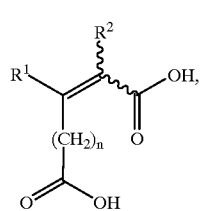

Formula I wherein $R^1$ or $R^2$ are independently H, $C_1$–$C_6$ alkyl, or phenyl, and at least one hydrogen atom on the $C_1$–$C_6$ alkyl substituent or the phenyl substituent is optionally substituted with at least one substituent selected from the group consisting of F, Cl, Br, I, nitro, cyano, and OH; and n is an integer from 0 to 2; an ester thereof, or an anhydride thereof; and grafting both the organic monomer and the diacid monomer to the porous polymeric support, wherein either the organic monomer comprises an ion exchange group covalently bonded thereto or an ion exchange group is introduced and covalently bonded to the organic moiety derived from the organic monomer, so as to provide an ion exchange membrane. Preferably, the organic monomer is an aryl monomer (comprising an aromatic ring). When an aryl monomer is used in the present method of preparing an ion exchange membrane, both the aryl monomer and the diacid monomer are grafted to the porous polymeric support. In one preferred embodiment, the aryl monomer comprises an aromatic ring bearing an ion exchange group covalently bonded thereto, so as to provide an ion exchange membrane.

In another preferred embodiment, an ion exchange group is introduced and covalently bonded to the aromatic ring of the aryl moiety (derived from the aryl monomer), so as to provide an ion exchange membrane.

Any suitable porous polymeric support can be used in the present method, including those described herein, and which are capable of forming a chemical graft with a suitable organic moiety. Preferably, the porous polymeric support is a polyolefin. More preferably, the porous polymeric support is polyethylene, particularly ultra high molecular weight polyethylene.

The present method of preparing an ion exchange membrane includes grafting one or more different substances, typically monomers, to the porous polymeric support and, if it is necessary to introduce an ion exchange group after forming the graft, covalently bonding an ion exchange group to the organic moiety. As described herein, when the organic moiety is an aryl moiety, the aromatic ring thereof desirably either has an ion exchange group covalently bonded thereto prior to grafting, or the ion exchange group is introduced to the aromatic ring of the aryl moiety after the aryl monomer is grafted to the porous polymeric support. Generally, introduction of the ion exchange group to the organic moiety in a post-graft step can be carried out in the presence or in the absence of the diacid moiety (derived from the diacid monomer), which can be a component of the organic moiety grafted to the porous polymeric support.

Thus, in one preferred embodiment, the organic monomer is an aryl monomer comprising an aromatic ring bearing at least one ion exchange group covalently bonded thereto. When the aromatic ring has an ion exchange group covalently bonded thereto, an additional ion exchange group need not be introduced to the aromatic ring of the aryl moiety after the aryl monomer is grafted to the porous polymeric support. Aryl monomers comprising an ion exchange group, covalently bonded to the aromatic ring thereof, can be obtained from commercial sources or by synthetic methods known in the art. For example, an ion exchange group can be synthetically introduced (i.e., covalently bonded) to an aromatic ring of the aryl monomer, or to the aromatic ring of a precursor of an aryl monomer. On the other hand, an aryl monomer possessing an aromatic ring with an ion exchange group covalently bonded thereto can be obtained from commercial sources. For example, aryl monomers such as styrenesulfonic acid (wherein the ion exchange group is a sulfonic acid) or vinylbenzoic acid (wherein the ion exchange group is a carboxylic acid) are commercially available. Thus, for example, an ultra high molecular weight polyethylene support can be contacted with a suitable styrenesulfonic acid solution and treated under suitable grafting conditions to provide an ultra high molecular weight polyethylene support and an aryl moiety (derived from styrenesulfonic acid) comprising a benzene ring to which is covalently bonded a sulfonic acid ion exchange group, wherein the aryl moiety is grafted to the porous ultra high molecular weight polyethylene support. Of course, if desired, the aromatic ring of the aryl moiety derived from the aryl monomer can be further substituted with an additional ion exchange group, which is the same as or different than the ion exchange group already attached to the aryl monomer, in order to confer ion exchange properties to the membrane which may be more suitable in a particular application. For example, the aromatic ring of the styrenesulfonic acid-derived aryl moiety can be further subjected to sulfonation conditions whereby a second (or perhaps a third) sulfonic acid ion exchange group is introduced to the aromatic ring of the aryl moiety, to provide an aromatic ring bearing two or more sulfonic acid ion exchange groups covalently bonded thereto. It may be desirable, for example, to incorporate more than one ion exchange group on the aromatic ring when the aryl moiety comprises a polycyclic aromatic ring, such as a naphthalene ring.

In an another preferred embodiment, the organic monomer is an aryl monomer comprising an aromatic ring which does not have an ion exchange group covalently bonded thereto. After the aryl monomer (lacking an ion exchange group) is grafted to the porous polymeric support, an ion exchange group is thereafter introduced and covalently bonded to the aromatic ring of the organic moiety derived therefrom, so as to provide an ion exchange membrane. Thus, an ion exchange group is introduced to an aromatic ring of the aryl moiety after the aryl monomer is grafted to the porous polymeric support.

The aryl moiety can be derived from any suitable aryl monomer comprising an aromatic ring. Suitable aryl monomers can possess a single aromatic ring (e.g., a benzene ring) or a fused aromatic ring, such as, for example, a naphthalene, a benzothiophene, or an anthracene ring. An aryl monomer having fused aromatic rings can include, for example, 2-vinylnaphthalene. The aryl monomer also can be a monomer capable of reacting by other mechanistic pathways in addition to being chemically grafted to the porous polymeric support. For example, divinylbenzene can undergo crosslinking reactions in addition to forming a graft to the porous polymeric support. Preferably, the aryl monomer comprises an unsubstituted aromatic ring, in which case the ion exchange group is introduced to an aromatic ring of the aryl moiety derived therefrom, after the monomer is grafted to the porous polymeric support. More preferably, the unsubstituted aromatic ring is a monocyclic aromatic ring, particularly a benzene ring. Still more preferably, the aryl monomer is styrene or a derivative thereof, most preferably styrene.

When a diacid monomer of Formula I is used in the present method of preparing an ion exchange membrane, n is preferably 0. It is also preferred that either $R^1$ or $R^2$ are H. More preferably, both $R^1$ and $R^2$ are H; however, other embodiments with respect to combinations of $R^1$ and $R^2$ such as, for example, those disclosed above, can be suitably co-grafted to the porous polymeric support along with the organic monomer, so as to provide an ion exchange membrane. Still more preferably, n is 0 and both $R^1$ and $R^2$ are H in the diacid monomer. Most preferably, the diacid monomer is maleic acid.

Grafting is the introduction of an organic moiety to a polymeric matrix (i.e., the porous polymeric support) via an energy source, which results in the formation of covalent bonds through which the organic moiety is bonded to the porous polymeric support. Thus, the organic moiety of the ion exchange membrane of the present invention is covalently bonded to the porous polymeric support. The organic moiety can be grafted to the porous polymeric support by any suitable means, many of which are known in the art such as, for example, irradiation, electron beam treatment, pre-irradiation grafting, post-irradiation grafting, thermal grafting, ultraviolet radiation, and plasma grafting. Preferably, the grafting is induced by radiation, more preferably by gamma radiation or by electron beam radiation, most preferably by gamma radiation.

A suitable ion exchange group is any functional group, any combination of functional groups, or any derivative thereof having an affinity for ions, as described herein. In the present method of preparing an ion exchange membrane, it is preferred that the ion exchange group covalently bonded to the organic moiety derived from the organic monomer is a sulfonic acid ion exchange group. More preferably, the sulfonic acid ion exchange group is introduced, and covalently bonded to, the aromatic ring of an aryl moiety after a suitable aryl monomer is grafted to the porous polymeric support.

Any suitable organic reaction method can be employed to introduce an ion exchange group to an organic moiety. For example, a cation exchange group (e.g., a sulfonic acid group) can be introduced to an aromatic ring, such as, for example, a benzene ring, by electrophilic chlorosulfonation with chlorosulfonic acid, followed by aqueous hydrolysis of the resulting sulfonyl chloride. An anion exchange group (e.g., an ammonium salt) can be introduced to an aromatic ring, such as, for example, a benzene ring, by nitration of the benzene ring, followed by reduction to the amine and subsequent quaternization with an appropriate alkylating agent. For a general description of substitution reactions, see March, "Advanced Organic Chemistry," Wiley-Interscience (1985). Preferably, the ion exchange group is a sulfonic acid group introduced by a sulfonation reaction.

Typically, introduction of a sulfonic acid ion exchange group to the aromatic ring of an aryl moiety grafted to the porous polymeric support is accomplished by subjecting the membrane, after grafting the aryl monomer thereto, to a sulfonating reagent (e.g., a chlorosulfonic acid solution) under conditions whereby the aromatic ring of the aryl moiety undergoes sulfonation, to provide an aromatic sulfonic acid species.

In the present method of preparing an ion exchange membrane, the membrane can be treated to remove contaminants, e.g., washed with high purity water to remove trace contaminants. Membranes having low levels of contaminants are highly desirable for applications in microlithography where trace contaminants can be detrimental.

The present invention is further directed to a method for treating a fluid containing ions which includes contacting the fluid with an ion exchange membrane of the present invention. Preferably, the method involves removing ions from a fluid containing ions, most preferably by passing the fluid through the ion exchange membrane of the present invention. The method of the present invention can be applied toward the removal of positively charged ions (e.g., sodium, magnesium, aluminum) and/or negatively charged ions (e.g, chloride, sulfate, nitrate) from a fluid. Desirably, the method of the present invention can be applied toward the removal of metal ions from a fluid containing metal ions, to provide a fluid with lower metal ion concentration. The present inventive method of treating a fluid is well suited for treating both organic and aqueous fluids, e.g., to remove ions from the fluids. For example, the present method of treating a fluid containing ions can be applied toward the treatment of organic solvents such as, for example, ethyl lactate or methanol. Moreover, the present method of treating a fluid can be applied toward the treatment of ion-containing organic solutions comprising an organic solvent and an organic solute, for example, organic solvent/organic resin solutions such as a methanolic organic resin solution. In addition, the present inventive method can effectively remove ions from organic photoresist solvents and solutions. Alternatively, the present method is equally well-suited for the removal of ions from an aqueous liquid (e.g., dilute aqueous HF), as well as solutions comprising a mixture of organic and aqueous solvents.

Desirably, the present inventive method of treating a fluid comprises contacting a fluid containing ions with an ion exchange membrane of the present invention to provide a fluid with reduced ion concentration. In one preferred embodiment, the present inventive method comprises contacting a fluid having a sodium ion concentration of about 2.5 ppm with the membrane of the present invention to provide a fluid with a sodium concentration less than about 0.2 ppm, preferably less than about 0.1 ppm of sodium ion. In another preferred embodiment, the present inventive method comprises contacting the membrane of the present invention with a fluid having a sodium ion concentration of about 8.4 ppm and an iron ion concentration of about 7.3 ppm, to provide a fluid having a sodium concentration less than about 0.1 ppm and an iron concentration less than about 0.2 ppm. In another preferred embodiment, the present inventive method comprises contacting the membrane of the present invention with a fluid having sodium and copper ion concentrations of about 0.9 ppm, to provide a fluid having sodium and copper ion concentrations less than about 0.09 ppm. In a highly preferred embodiment, the present inventive method comprises contacting the membrane of the present invention with a fluid having a metal ion concentration from about 900 ppb to about 0.2 ppb to provide a fluid having a metal ion concentration less than about 9 ppb, preferably less than about 1 ppb, more preferably less than about 0.1 ppb.

The present invention further provides a filtration apparatus for removing ions from a fluid, which can be used in the present inventive method of treating fluids. The apparatus includes a filter unit and a means for passing the fluid through the filter unit. Optionally, the filtration apparatus of the present invention further includes a means for recovering the filtrate. The filter unit utilizes an ion exchange membrane of the present invention. Preferably, the filtration apparatus of the present invention employs a filter unit having a cation exchange membrane as described herein. More preferably, the filtration apparatus employs a filter unit having a cation exchange membrane wherein at least one ion exchange group is a sulfonic acid group and which is effective in removing trace metal contaminants from organic solvents and solutions, providing solvents or solutions with extremely low concentrations of metal ions, or which are virtually free of metal ions. In a preferred embodiment, the filter unit utilizes a cation exchange membrane comprising a porous polymeric support and an aryl moiety comprising an aromatic ring to which is covalently bonded an ion exchange group, wherein the aryl moiety is grafted to the porous polymeric support. In another preferred embodiment, the filtration apparatus of the present invention utilizes a cation exchange membrane comprising a porous polymeric support and an organic moiety which includes an aryl moiety comprising an aromatic ring to which is covalently bonded an ion exchange group, and a diacid moiety derived from a monomer of Formula I, wherein the aryl moiety and the diacid moiety are grafted to the porous polymeric support, as described herein.

The following examples further illustrate the present invention but, of course, should not be construed as in any way limiting its scope.

EXAMPLE 1

This example describes a method for preparing a cation exchange membrane of the present invention by providing a porous ultra high molecular weight polyethylene support, contacting it with a styrene monomer, grafting the styrene monomer to the support via gamma radiation, and introducing a sulfonic acid cation exchange group via sulfonation.

A membrane made of ultra high molecular weight polyethylene and having a pore size of about 2 $\mu$m was obtained commercially (Solupor 16-P20™, DSM Solutech, B.V.). The membrane roll (153 m×61 cm (500 feet×24 in)) was interleaved with paper and placed into a canister which was then vacuum filled with a grafting solution containing 15% styrene by weight in methylene chloride. The system was irradiated at approximately 6,000 R/hour for 60 hours at ambient temperature. The resulting grafted membrane was removed from the grafting solution and washed with methylene chloride. The grafted membrane was placed in a sulfonation bath containing 3 wt. % chlorosulfonic acid. Next, the membrane was washed with water, followed by 5% aqueous HCl, then trickle washed with high purity water to provide a cation exchange membrane of the present invention.

EXAMPLE 2

This example illustrates the ion exchange characteristics of an ion exchange membrane of the present invention. The ion exchange capacity (IEC) of a cation exchange membrane prepared in accordance with Example 1 was determined. Table 1 sets forth the IEC of the ion exchange membrane of Example 1 ("Membrane 1") in an ethyl lactate solution (EL). The IEC's as a function of unit mass (mmol-eq/g), unit area ($\mu$mol-eq/cm$^2$), and unit volume (mmol-eq/cm$^3$) were determined.

TABLE 1

| Properties | Membrane 1 |
|---|---|
| IEC (mmol-eq/g) | 1.97 |
| IEC ($\mu$mol-eq/cm$^2$) | 6.43 |
| IEC (mmol-eq/cm$^3$) | 0.52 |
| Thickness ($\mu$m) | 124 |
| Weight per Area (mg/cm$^2$) | 3.3 |
| Flow (ml/min/cm$^2$) EL @ 1 atm | 1.5 |

The data set forth in Table 1 reveal that the ion exchange membrane of the present invention exhibits excellent IEC's with respect to unit mass, unit area, and unit volume. Further, the relatively high flow rate across the membrane at atmospheric pressure (1.5 ml/min/cm$^2$) indicates that the membrane has sufficiently high flux to function effectively in filtration applications.

EXAMPLE 3

This example illustrates the ability of a cation exchange membrane of the present invention to treat different organic solvents containing ions.

In this example, a cation exchange membrane prepared in accordance with Example 1 was tested for its ability to remove a wide variety of metal cation contaminants in three different photoresist solvents. Photoresist solvents methylamyl ketone (MAK), ethyl-3-ethoxypropionate (EEP), and propylene glycol methyletheracetate (PGMEA) were obtained commercially (Aldrich Chemical Co., Milwaukee, Wis.), and passed through cation exchange membranes prepared in accordance with Example 1. The filtrate was recovered for analysis. For each of these photoresist solvents, the concentrations of metal ions were determined before and after the solutions were passed through the membrane. The results are set forth in Table 2. Although the indicated metals existed in ionic form, the oxidation states of the metal ions was not determined.

TABLE 2

| Element | DL (ppb) | MAK Before (ppb) | MAK After (ppb) | EEP Before (ppb) | EEP After (ppb) | PGMEA Before (ppb) | PGMEA After (ppb) |
|---|---|---|---|---|---|---|---|
| Al | 0.1 | 3.4 | 0.5 | <DL | <DL | 0.9 | <DL |
| B  | 2.0 | <DL | <DL | <DL | <DL | <DL | <DL |
| Ca | 3.0 | 64 | 8.1 | <DL | <DL | 3.5 | <DL |
| Cr | 0.5 | 2.2 | <DL | <DL | <DL | <DL | <DL |
| Cu | 0.5 | 11 | 0.8 | <DL | <DL | 6.8 | <DL |
| Fe | 2.0 | 20 | <DL | <DL | <DL | 12 | <DL |
| Pb | 0.1 | 6.5 | <DL | <DL | <DL | 2.9 | <DL |
| Li | 0.05 | <DL | <DL | <DL | <DL | <DL | <DL |
| Mg | 0.1 | 9.7 | 1.1 | 1.0 | 0.8 | 0.6 | <DL |
| Mn | 0.1 | 0.6 | <DL | <DL | <DL | 0.2 | <DL |
| Ni | 0.1 | 0.2 | <DL | <DL | <DL | <DL | <DL |
| K  | 3.0 | <DL | 3.9 | <DL | <DL | <DL | <DL |
| Na | 0.1 | 860 | 4.3 | 64 | 3.6 | 310 | 0.6 |
| Sn | 1.0 | <DL | <DL | <DL | <DL | <DL | <DL |
| Ti | 1.0 | 2.1 | <DL | <DL | <DL | <DL | <DL |
| Zn | 0.5 | 150 | 0.9 | 4.7 | <DL | 690 | <DL |

The concentration detection limits ("DL") of the various metal ion contaminants are shown in the "DL" column of Table 2. The DL was determined using the inductive couple plasma/mass spectrum (ICP/MS) method, which has a DL in the 0.1–3 ppb range, depending upon the particular metal tested. The concentrations of the metal contaminants for each solvent prior to treatment are shown in the "Before" column, and the concentrations of metal ion contaminants after treatment are shown in the "After" column. Metal ion concentrations below the detection limit are shown as "<DL".

As is apparent from the resulting data set forth in Table 2, the metal ion concentrations fell significantly as a result of the present inventive treatment. For example, the Na concentrations in MAK fell from 860 ppb to 4.3 ppb after treatment. In PGMEA, the Na concentration fell from 310 ppb to 0.6 ppb, and the Zn concentration fell dramatically from 690 ppb to below the detection limit after treatment. These data demonstrate that an ion exchange membrane of the present invention significantly removes a variety of metals in photoresist solvents. Significantly, the metal concentrations were reduced to single digit ppb levels, providing solvents with metal concentrations several orders of magnitude below the ppm range.

EXAMPLE 4

This example illustrates the effect of flow rate on effluent Na concentration in a photoresist solvent treated in accordance with the present invention.

A filtration apparatus having three layers, each of which was an ion exchange membrane prepared in accordance with Example 1, was tested for removal of sodium ions at various flow rates in a photoresist solvent contaminated with 2.55 ppm Na. Each layer had an exposed surface area of 50 cm$^2$. The contaminated photoresist solvent was passed through the ion exchange membrane at various flow rates, and the effluent was analyzed for Na by atomic absorption (AA), which has a DL within the 0.05 ppm range.

The results are set forth in Table 3. The "time" column represents the time intervals at which the effluent was collected over six ranges, the ranges being delineated by the time points set forth in the column. Thus, sample 1 was collected during the first 3 minutes of effluent collection, at the indicated flow rate, and analyzed for sodium. Samples 2–6 represent samples collected over subsequent one minute intervals, each interval being delineated by the beginning and the end times set forth therein. The "weight" column sets forth the weight of effluent actually collected for metal ion analysis over the indicated time interval. The "flow rate" column indicates the rate at which the influent passed through the filtration apparatus over the indicated time interval (g/min) as calculated by dividing the weight of collected effluent by the time of collection.

TABLE 3

| Sample | Time (min) | Effluent Weight (g) | Flow Rate (g/min) | Effluent Na (ppm) |
|---|---|---|---|---|
| 0 | Initial | 15.26 | — | 2.55 |
| 1 | 0–3 | 17.18 | 5.7 | 0.12 |
| 2 | 3–4 | 22.18 | 22.2 | 0.06 |
| 3 | 4–5 | 31.38 | 31.4 | 0.06 |
| 4 | 5–6 | 29.51 | 29.5 | 0.04 |
| 5 | 6–7 | 25.23 | 25.2 | 0.03 |
| 6 | 7–8 | 21.06 | 21.1 | 0.05 |

The results in Table 3 indicate that the present inventive cation exchange membrane effectively removed Na ion contaminants independent of flow rate. Thus, for example, measurement 3 taken between 4 and 5 minutes at a flow rate of 31.4 g/min is essentially the same a s that of measurement 6, taken between 7 and 8 minutes at the lower flow rate of 21.1 g/min (0.06 ppm v. 0.05 ppm, respectively).

EXAMPLE 5

This example determined the breakthrough curve for a one-layer cation exchange membrane prepared in accordance with Example 1.

An ethyl lactate solution spiked with 20 ppm Na was passed through a single layer ion exchange membrane prepared in accordance with Example 1, and the concentration of Na in the effluent was monitored. The results are graphically depicted in FIG. 1. The Y-axis indicates the ratio of Na concentration of the effluent to that of the influent in percentage units. The X-axis indicates the total amount of challenged Na ($\mu$g). The effluent/influent ratio was measured at various points from a predetermined total of challenged Na, calculated from the total effluent volume of contaminated ethyl lactate.

The resulting data indicates the range at which the ion exchange membrane begins to lose the ability to retain sodium. In this example, the ion exchange membrane began to lose its ability to trap Na after a total challenge of 1500 $\mu$g to 2500 $\mu$g Na.

EXAMPLE 6

This example evaluated one layer and five layer systems, wherein each layer was an ion exchange membrane prepared in accordance with Example 1 ("Membrane 1"), for relative capacity to remove sodium in ethyl lactate.

The results were compared with the theoretical values of simulated systems having from 1 to 6 layers of Membrane 1 of the present invention.

Figure 2:
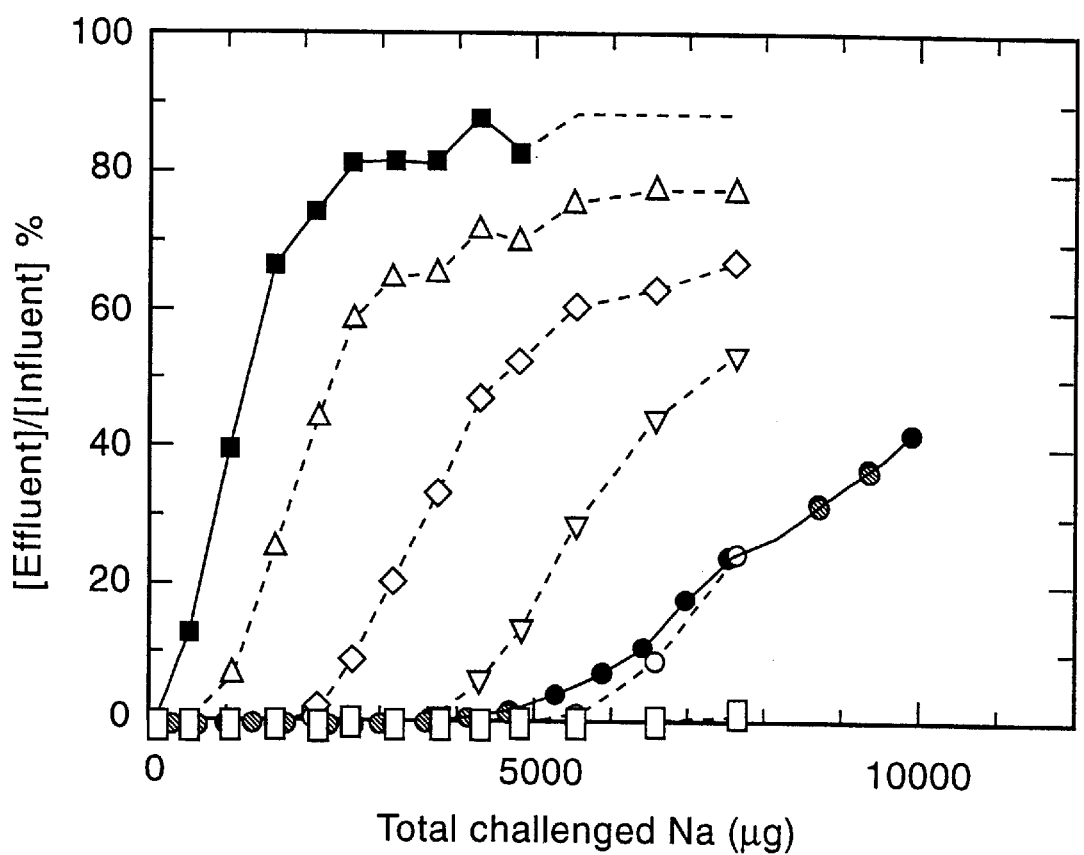
FIG. 2 is a graphical depiction comparing actual and calculated Na ion removal profiles ([Effluent]/[Influent]% versus Total Challenged Na($\mu$g)) of different layer systems of ion exchange membranes of the present invention.

The results are shown in FIG. 2. The Y-axis indicates the ratio of Na concentration of the effluent to that of the influent (expressed in percentage units). The X-axis indicates the total amount of challenged Na ($\mu$g). The effluent/influent Na concentration ratios for actual one and five layer systems of Membrane 1 were calculated from various predetermined total challenges by Na in ethyl lactate, wherein the actual one layer system is indicated by darkened squares (■), and the actual five layer system is indicated by darkened circles (●). The theoretical effluent/influent Na concentration ratios for simulated systems having from one to six layers are depicted by unfilled (i.e., hollow, not darkened) shapes, wherein the simulated two layer system is indicated by upright triangles (△), the simulated three layer system is indicted by diamonds (◇), the simulated four layer system is indicated by invert ed triangles (▽), the simulated five layer system is indicated by circles (○), and the simulated six layer system is indicated by rectangle s (□).

The resulting data demonstrate that the employment of multiple layers additively increases overall ion removal capacity. Since the curve for the actual five layer system correlates well with the theoretical curve of the five layer system, these data can b e useful in predicting the effect of multiple layers on ion removal capacity.

EXAMPLE 7

This example compares the ion removal capacities of a commercially available ion exchange medium with that of an ion exchange membrane prepared in accordance with Example 1 ("Membrane 1").

Ethyl lactate containing Na and Fe ions was passed through a Gelman ICE-450™ (Pall Corporation) medium and membrane 1. The metal ion concentration in the effluent for each membrane was measured after several predetermined total challenges of metal ion.

Figure 3:
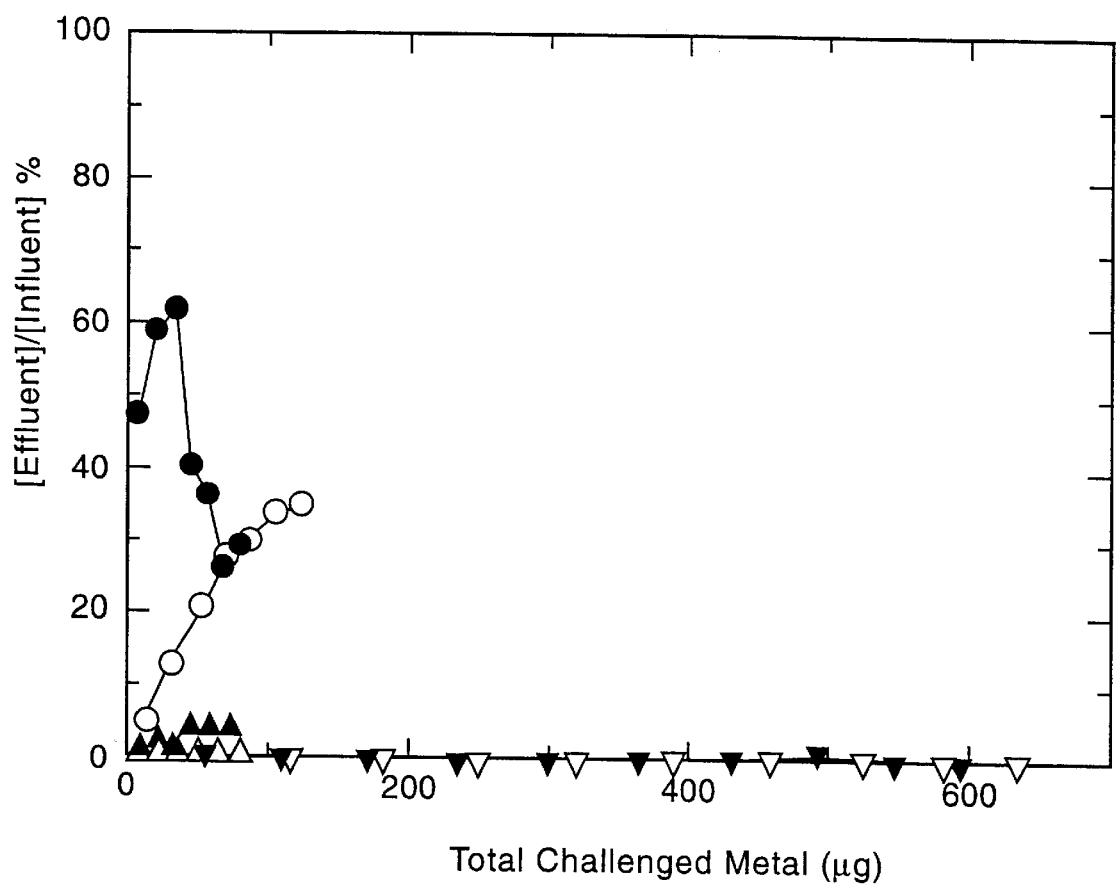
FIG. 3 is a graphical depiction of the metal ion removal performance ([Effluent]/[Influent]% versus Total Challenged Na($\mu$g)) of an ion exchange membrane of the present invention as compared with a Gelman ICE-450™ (Pall Corporation) medium.

The results are set forth in FIG. 3. The Y-axis indicates the effluent/influent metal ion concentration ratios in percentage units. The X-axis indicates the total challenge of metal ion ($\mu$g). The results obtained with respect to sodium (Na) ion removal to are represented by hollow (unfilled) shapes. The results obtained with respect to iron (Fe) ion removal are represented by darkened shapes.

The darkened circles (●) indicate the results obtained with respect to iron ion removal by the Gelman ICE-450™ medium. The hollow circles (○) represent the results obtained with respect to sodium ion removal by the Gelman ICE-450™ medium. The hollow upright triangles (△) indicate the results obtained with respect to sodium ion removal by Membrane 1 of the present invention. The darkened upright triangles (▼) indicate the results obtained with respect to the removal of iron ions, in the form of ferrocene, by Membrane 1 of the present invention. The hollow inverted triangles (▽) indicate the results obtained with respect to sodium ion removal by retesting Membrane 1 of the present invention against sodium ion removal. The darkened inverted triangles (▲) indicate the results obtained with respect to the removal of iron ions by retesting Membrane 1 of the present invention against iron ion removal.

These data demonstrate that the metal ion removal capacity of the present inventive ion exchange membrane dramatically exceeds that of the Gelman ICE-450™ medium. For instance, after a total challenge of 600 $\mu$g Na and Fe, the effluent/influent metal concentration ratio was virtually 0% for the present inventive ion exchange membrane (Membrane 1), whereas the ratio for the Gelman ICE-450™ medium was substantially higher (20% to 60%) after significantly lower total Na and Fe challenges (<100 $\mu$g).

EXAMPLE 8

This example illustrates a method of preparing an ion exchange membrane of the present invention, wherein an aryl monomer and a diacid monomer are co-grafted to the porous polymeric support to form an organic moiety which includes an aryl moiety component and a diacid moiety component. Thereafter, a sulfonic acid ion exchange group is introduced and covalently bonded to the aromatic ring of the aryl moiety component, so as to provide an ion exchange membrane.

An ultra high molecular weight polyethylene support (3.05 m×40.6 cm (10 ft×16 in)) was provided and made into a roll with paper interleaf, and the roll was introduced into a test tube. A grafting solution of styrene (10% by weight), maleic acid (10% by weight), and methanol (80% by weight) was added. After evacuating and purging the test tube (three times), it was irradiated at ambient temperature with gamma radiation at approximately 7,000 R/hour for 72 hours. The membrane was washed with methylene chloride (two times) and placed in a chlorosulfonic acid bath (3% chlorosulfonic acid by weight in methylene chloride) for 30 minutes. The membrane was washed with high purity deionized water for about 30 minutes at 80° C. The resultant membrane was dried by passing it through a heated dryer, and was rewound as a finished product.

The properties of the resulting ion exchange medium were determined, specifically basis weight, thickness, critical wetting surface tension (CWST), IEC, and water flow rate. The resulting data are set forth in Table 4.

TABLE 4

| | |
|---|---|
| Basis Weight (g/m$^2$) | 48 |
| Thickness ($\mu$m) [mils] | 196 [7.7] |
| CWST (mN/m) [dyne/cm] | 73 [73] |
| IEC (mmol-eq/g) | 3.5 |
| Water Flow Rate (1/min/kPa/m$^2$) [1/min/psi/ft$^2$] | 1.5 [0.96] |

The data in Table 4 demonstrate that the ion exchange membrane of the present invention has excellent ion exchange capacity (IEC) per unit mass (3.5 mmol-eq/g). Moreover, the ion exchange membrane exhibits a high water flow rate across the membrane, indicating that the membrane is of sufficiently high flux to function effectively in filtration applications.

EXAMPLE 9

This example illustrates the effectiveness of the ion exchange membrane of the present invention in removing ions from organic solvents containing ions. In this example, a cation exchange membrane prepared in accordance with Example 8 ("Membrane 2") was tested for its ability to remove sodium and ferric ions from a methanol/organic resin solution.

A five-layer media disc was prepared, with each layer being a section of Membrane 2, and the media disc was placed in a jig. A methanol/organic resin solution containing ions was prepared by spiking a methanol/organic resin solution with sodium (Na$^+$) and ferric (Fe$^{3+}$) ions. The spiked solution was passed through the media disc, and both the influent and effluent streams were analyzed for concentration of metal ions. The sodium and ferric ion concentrations for the influent stream, and for particular volumes of the effluent stream, were measured by AA. The percent removal of the ions for each volume of effluent also was calculated. The resulting data are set forth in Table 5.

TABLE 5

| | Na+ Ion (ppm) | % Removal | Fe3+ Ion (ppm) | % Removal |
|---|---|---|---|---|
| Influent | 8.4 | — | 7.3 | — |
| Effluent (20 ml) | 0.05 | 99.4 | 0.08 | 98.9 |
| Effluent (40 ml) | 0.05 | 99.4 | 0.10 | 98.6 |
| Effluent (60 ml) | 0.06 | 99.3 | 0.10 | 98.6 |

The data in Table 5 clearly demonstrate that the ion exchange membrane of the present invention is highly effective in removing ions from organic solvents and/or solutions. In particular, Membrane 2 is highly effective at removing both alkali metal ions and heavy metal ions. For example, Membrane 2 removed nearly 99% of the ferric ions in solution. Moreover, Membrane 2 removed greater than 99% of the sodium ions. The performance of the membrane was consistent at all the indicated effluent levels. The ability of the present membrane to remove heavy metal ions is remarkable in that heavy metal ions are typically very difficult to remove from solution by filtration. Further, the ion exchange membrane of the present invention demonstrated excellent ion removal capacity, since the spiked ion concentrations used in the present example were high (in excess of 1 ppm).

EXAMPLE 10

This example demonstrates the ability of the ion exchange membrane of the present invention to remove ions from aqueous solutions containing ions. In this example, a cation exchange membrane prepared in accordance with Example 8 ("Membrane 2") was tested for its ability to remove alkali metal ions and heavy metal ions from an aqueous hydrofluoric acid solution.

A five-layer media disc was provided in the same manner as set forth in Example 9. A 0.1% aqueous HF solution containing ions was prepared by spiking a 0.1% aqueous HF solution with known concentrations of sodium (Na) and copper (Cu) ions. The spiked solution was passed through the media disc, and both the influent and effluent streams were analyzed for concentration of metal ions. The sodium and copper ion concentrations for the influent stream, and for particular volumes of the effluent stream, were measured by AA. The percent removal of the ions for each volume of effluent was calculated. The resulting data are set forth in Table 6.

TABLE 6

| | Na Ion (ppm) | % Removal | Cu Ion (ppm) | % Removal |
|---|---|---|---|---|
| Influent | 0.86 | — | 0.90 | — |
| Effluent (10 ml) | 0.03 | 97 | 0.0 | 100 |
| Effluent (20 ml) | 0.02 | 98 | 0.0 | 100 |
| Effluent (30 ml) | 0.03 | 97 | 0.05 | 95 |
| Effluent (40 ml) | 0.01 | 99 | 0.01 | 99 |
| Effluent (50 ml) | 0.02 | 98 | 0.0 | 100 |
| Effluent (60 ml) | 0.01 | 99 | 0.0 | 100 |

The data in Table 6 clearly demonstrate that the ion exchange membrane of the present invention is highly effective in removing ions from aqueous solvents and/or solutions. In particular, the present membrane is highly effective at removing trace alkali metal ions and heavy metal ions in an aqueous medium. For example, Membrane 2 removed 100% of the copper ions in solution, and 99% of the sodium ions, as determined by AA, after 60 ml of 0.1% HF effluent was collected.

All of the references, including patent and patent application, cited herein are hereby incorporated in their entireties by reference.

While this invention has been described with an emphasis on preferred embodiments, it will be obvious to those of ordinary skill in the art that variations of the preferred embodiments can be used and that it is intended that the invention can be practiced otherwise than as specifically described herein. Accordingly, this invention includes all modifications encompassed within the spirit and scope of the invention as defined by the following claims.

What is claimed is:

1. A method of removing metal ions from an organic fluid containing metal ions comprising passing an influent of the organic fluid through a porous ion exchange membrane to provide an effluent of the organic fluid, the effluent containing a lower concentration of the metal ions than the influent, the ion exchange membrane comprising a porous polymeric support and an organic moiety to which is covalently bonded at least one ion exchange group, wherein the organic moiety is grafted to the porous polymeric support.

2. The method of claim 1, wherein the organic moiety comprises an aryl moiety.

3. The method of claim 2, wherein the organic moiety further comprises a diacid moiety derived from a monomer of the formula:

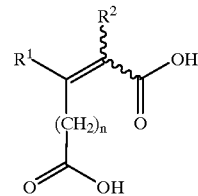

wherein $R^1$ or $R^2$ are independently H, $C_1$–$C_6$ alkyl, or phenyl, and at least one hydrogen atom on the $C_1$–$C_6$ alkyl or the phenyl is optionally substituted with at least one substituent selected from the group consisting of F, Cl, Br, and OH; and n is an integer from 0 to 2; an ester thereof, or an anhydride thereof.

4. The method of claim 3, wherein n is 0.

5. The method of claim 3, wherein $R^1$ and $R^2$ are H.

6. The method of claim 3, wherein the aryl moiety comprises a benzene ring to which is covalently bonded a sulfonic acid ion exchange group, and the diacid moiety is derived from maleic acid.

7. The method of claim 2, wherein the aryl moiety is a styrene moiety.

8. The method of claim 1, wherein the organic fluid is a photoresist solution.

9. The method of claim 2, wherein the photoresist solution comprises one or more solvents selected from the group consisting of methyl-amyl ketone, ethyl-3-ethoxypropionate, propylene glycol methyletheracetate, methanol, and ethyl lactate.

10. The method of claim 1, wherein the metal ions are ions of one or more metals selected from the group consisting of Al, Ca, Cr, Cu, Fe, Pb, Mg, Mn, Ni, K, Na, Sn, Ti, and Zn.

11. The method of claim 10, wherein the metal ions are ions of one or more metals selected from the group consisting of Ca, Cu, Fe, Na, and Zn.

12. The method of claim 1, wherein the concentration of metal ions in the effluent is less than about 1 ppb.

13. The method of claim 12, wherein the concentration of metal ions in the effluent is less than about 0.1 ppb.

14. The method of claim 1, wherein the porous polymeric support comprises a polyolefin.

15. The method of claim 14, wherein the polyolefin is ultra high molecular weight polyethylene.

16. The method of claim 1, wherein the ion exchange group is a cation exchange group.

17. The method of claim 16, wherein the cation exchange group is a sulfonic acid.

18. The method of claim 1, wherein the concentration of metal ions in the influent is about 0.2–900 ppb, and the concentration of metal ions in the effluent is less than about 9 ppb.

19. The method of claim 1, wherein the influent contains Na ions, the concentration of Na ions in the influent is at most about 8.4 ppm, and the concentration of Na ions in the effluent is less than about 0.1 ppm.

20. The method of claim 1, wherein the influent contains Fe ions, the concentration of Fe ions in the influent is at most about 7.3 ppm, and the concentration of Fe ions in the effluent is less than about 0.2 ppm.

21. The method of claim 1, wherein the influent contains Fe ions, the concentration of Fe ions in the influent is at most about 20 ppb, and the concentration of Fe ions in the effluent is less than about 2 ppb.

22. The method of claim 1, wherein the influent contains Na and Cu ions, the concentration of Na and Cu ions in the influent is at most about 0.9 ppm, and the concentration of each of Na and Cu ions in the effluent is less than about 0.09 ppm.

23. The method of claim 1, wherein the concentration of metal ions in the effluent is at least about 99% less than the concentration of metal ions in the influent.

* * * * *